United States Patent
Chia

[15] 3,676,481
[45] July 11, 1972

[54] CATALYTIC ISOMERIZATION OF 2-METHYL-3-BUTENENITRILE TO LINEAR PENTENENITRILES IN THE PRESENCE OF CERTAIN METAL SALT AND/OR TRI(HYDROCARBYL)BORON PROMOTERS

[72] Inventor: Yuan-Tsan Chia, Wilmington, Del.

[73] Assignee: E. I. du Pont de Nemours and Company, Wilmington, Del.

[22] Filed: June 29, 1970

[21] Appl. No.: 50,907

Related U.S. Application Data

[63] Continuation-in-part of Ser. No. 758,578, Sept. 9, 1968, abandoned, which is a continuation-in-part of Ser. No. 678,216, Oct. 26, 1967, abandoned.

[52] U.S. Cl.................................260/465.9, 260/439
[51] Int. Cl..........................................C07c 121/30
[58] Field of Search.................................260/465.9

[56] References Cited

UNITED STATES PATENTS

| | | |
|---|---|---|
| 3,522,288 | 7/1970 | Drinkard, Jr. et al..........260/465.9 X |
| 3,526,654 | 9/1970 | Hildebrand......................260/465.9 |
| 3,536,748 | 10/1970 | Drinkard Jr. et al.............260/465.9 |
| 3,538,142 | 11/1970 | Drinkard, Jr. et al............260/465.9 |
| 3,542,847 | 11/1970 | Drinkard Jr. et al.............260/465.9 |
| 3,551,474 | 12/1970 | Drinkard, Jr. et al............260/465.9 |
| 3,579,560 | 5/1971 | Drinkard, Jr. et al............260/465.9 |

*Primary Examiner*—Joseph P. Brust
*Attorney*—D.R.J. Boyd

[57] ABSTRACT

The present invention discloses the isomerization of 2-methyl-3-butenenitrile to linear pentenenitriles in high yield by means of catalysts which comprise zero-valent nickel complexes promoted by certain metal salt and/or tri(hydrocarbyl)-boron promoters at temperatures in the range 10°–200° C. The linear pentenenitrile product, principally 3-pentenenitrile, is useful as an intermediate to adiponitrile.

27 Claims, No Drawings

3,676,481

CATALYTIC ISOMERIZATION OF 2-METHYL-3-BUTENENITRILE TO LINEAR PENTENENITRILES IN THE PRESENCE OF CERTAIN METAL SALT AND/OR TRI(HYDROCARBYL)BORON PROMOTERS

RELATED APPLICATION

This application is a continuation-in-part of my copending application Ser. No. 758,578, filed Sept. 9, 1968, which is a continuation-in-part of my application Ser. No. 678,216 filed Oct. 26, 1967, both now abandoned.

FIELD OF THE INVENTION

This invention relates to, and has as its principal object provision of, a new process for the catalytic isomerization of 2-methyl-3-butenenitrile to linear pentenenitriles.

BACKGROUND OF THE INVENTION

The patent of Drinkard and Lindsey U.S. Pat. No. 3,496,215 issued Feb. 17, 1970 discloses and claims the hydrocyanation of certain olefinic compounds, which may include the starting material of this invention, 2-methyl-3-butenenitrile, and the principal product of this invention, 3-pentenenitrile, in the presence of zero-valent nickel catalysts which are effective as catalysts for isomerization of 2-methyl-3-butenenitrile by the process of this invention.

A continuation-in-part of the above-mentioned Drinkard and Lindsey Patent, Ser. No. 678,171, filed Oct. 26, 1967, now U.S. Pat. No. 3,536,748 discloses and claims the isomerization of 2-methyl-3-butenenitrile to linear pentenenitriles in the presence of the zero-valent nickel complex catalyst of its parent application. The present application covers an improvement in the process of the second Drinkard and Lindsey application.

There is no other known prior art which discloses isomerization of a branched chain pentenenitrile to a linear nitrile.

DESCRIPTION OF THE INVENTION

It has now been found that the catalytic isomerization of 2-methyl-3-butenenitrile to pentenenitrile with certain nickel complex catalysts can be improved by the addition of certain promoters to the system.

The promoters employed in the present invention are salts of metals having atomic numbers 13, 21–32, 39–50 and 57 to 82 and compounds of the formula $BR'_3$ wherein $R'$ is an alkyl or an aryl radical of up to 18 carbon atoms. The mole ratio of promoter to catalyst should be in the range of 1:20 to 50:1.

The nickel catalysts which are employed in the present invention can be described broadly as zero-valent nickel complexes which are coordinated with at least one phosphorus ligand containing a POR linkage where R is alkyl or aryl of up to 18 carbon atoms, i.e., phosphorus ligands having the formula P(XYZ) where X is OR and Y and Z are OR or R and where any of X, Y and Z can be conjoined to form a divalent radical. Examples of divalent conjoined Y and Z are tetramethylene, pentamethylene, and ethylenedioxy groups. The ethylenedioxy group is an example of a divalent conjoined X with Y or Z.

The preferred catalysts are zero-valent nickel compounds of the general formula $Ni[P(XYZ)]_4$, and in particular those compounds where the P(XYZ) groups are aryl phosphites such as triphenyl phosphite and tricresyl phosphite.

In addition to the above tris(p-methoxyphenyl) phosphite has been found to be a useful ligand with desirable solubility properties, The catalyst can be prepared and added to the reaction mixture or alternatively the catalyst can be formed in situ by a number of techniques, for example, by reduction of a nickel salt in the presence of the phosphorus ligand. If sufficient ligand is present, the product will be zero-valent nickel compound as described above. On the other hand, the process of the present invention is operable when less than the stoichiometric amount of phosphorus ligand is present.

When a catalyst such as $Ni[P(XYZ)]_4$ is employed, the process of this invention is believed to involve the attachment of a 2-methyl-3-butenenitrile molecule to the catalyst by displacement of two of the ligands. This or a similar intermediate may be formed directly where the catalyst is prepared in situ particularly when less than the stoichiometric quantity of the phosphorus ligand is employed. Rearrangement of the intermediate complex then occurs by migration of the nitrile group, although whether this occurs by an intermolecular or an intramolecular mechanism is not known. The promoters are believed to interact with the nitrile group and further facilitate the transformation. In some instances, as noted hereinafter, intermediate complexes having a structure which is not fully known can be obtained as solids from the reaction medium, which are stable and can themselves be employed as catalysts for the reaction.

It is apparent that the initial prepared catalyst and the complex formed by ligand displacement with the 2-methyl-3-butenenitrile molecule are zero-valent nickel complexes, however, the further intermediate states which may be present and be isolable in this system may or may not be complexes of zero-valent nickel, yet are capable of acting as catalysts. Zero-valent nickel compounds are believed to occur in the cycle regardless, and in any event some zero valent nickel compounds are believed to be present at all times in the system. Accordingly, in this specification and the appended claims, the term "zero-valent nickel catalyst" refers to the initial zero-valent nickel catalyst added to the system or formed therein and to intermediate catalytic species derived from such catalysts.

It is evident that mixtures of catalysts and/or promoters can be employed in the practice of this invention, and indeed are frequently inherently employed when the catalyst is formed in situ, especially when less than the stoichiometric amount of ligand necessary to form a zero-valent nickel compound is used.

The above definition of the zero-valent nickel compounds which are preformed catalysts in the practice of this invention includes species wherein mixtures of substituents on the phosphorus atoms or mixtures of ligands are used. It has been found that the use of such mixtures is frequently advantageous in preventing the crystallization of catalyst species from the reaction medium.

The preparation of zero-valent nickel compounds suitable as catalysts is disclosed in U.S. Pat. Nos. 3,152,158 and 3,328,443.

The nickel complex catalysts can also be prepared in situ by, for example, displacement of another neutral ligand with the required phosphorus ligand or by reduction of an Ni(II) compound in the presence of the ligand.

The intermediate zero-valent nickel compounds which form active catalysts in situ prior to addition of the ligand can themselves be prepared in situ on addition of the ligand. Such nickel compounds, which include those containing carbon monoxide, phosphines, arsines, stibenes, arsenites, stibites, acrylonitrile, and mixtures thereof, can be represented by the formula:

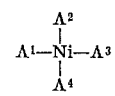

wherein $A^1$, $A^2$, $A^3$ and $A^4$, are neutral ligands, which may be the same or different, and represent carbon monoxide and $M(X'Y'Z)$ wherein M is P, As, and Sb, and $X'$, $Y'$, and $Z'$ are the same or different and are defined as a member of the class consisting of $R'$, $NR'_2$, Cl, and F, and wherein $R'$ is a member of the class consisting of alkyl and aryl groups having up to 18 carbon atoms. When acrylonitrile is a neutral ligand, the values of $A^1$, $A^2$, $A^3$, and $A^4$ in the above formula are satisfied by two molecules of acrylonitrile alone (one molecule being represented by a pair of the A's) or by two molecules of acrylonitrile and two M(X'Y'Z') entities (one molecule of acrylonitrile being represented by one of the A's).

The active catalyst is then prepared by addition of P(XYZ) ligand to the intermediate zero-valent nickel compound. The amount of phosphorus ligand relative to the intermediate nickel compound should provide at least one P(XYZ) group per nickel atom and preferably two moles per mole of nickel. A second technique involves adding the neutral phosphorus ligand (as defined above), a nickel (II) compound such as a nickel halide, e.g., $NiCl_2$, $Ni(CN)_2$, or Ni-bis(acetylacetonate) and a source of hydride ($H^-$) ions. Suitable sources of $H^-$ ions are compounds of the structure $M'[BH_4]_n$, $H_2$, and $M'H_n$ where $M'$ is an alkali metal or an alkaline earth metal and $n$ is a number corresponding to the valence of the metal. Reduction can also be accomplished by use of an electropositive metal such as zinc. A third technique is to add dicyclopentadienylnickel and a neutral ligand such as $P(OR'')_3$ where $R''$ is aryl, to the reaction mixture. In each case, the compound is formed under the displacement reaction conditions described above and no other special temperatures or pressures need be observed.

The intermediate zero-valent nickel compounds and also the zero-valent nickel catalysts and catalytic reaction products prepared in situ are characterized by having neutral ligands which are thought to be bonded to the central metal atom by both sigma- and pi-type bonds. This type of bonding is described, for example, in Cotton and Wilkinson (Advanced Inorganic Chemistry, Interscience Publishers, 1962, pp. 602–606).

The improved isomerization process of the present invention requires the use of a promoter, which may be one or more members of the group comprising salts of metals belonging to Groups IB, IIB, IIIA, IIIB, IVA, IVB, VB, VIB VIIB, and VIII, i.e., elements of atomic number 13, 21–32, 39–50, and 57–82, of the Periodic Table, and tri(hydrocarbyl) borons. (The Periodic Table referred to here is, for example, that copyrighted in 1962 by the Dyna-Slide Co., and published by the E. H. Sargent and Co.) Preferred metals are those of Group IIB (Zn, Cd), VB (V), VIB (Cr, Mo), VIIB (Mn), and VIII (Fe, Co). The anions of the metal salts include halides (preferably chlorides or bromides), sulfates, phosphates and lower aliphatic carboxylates (preferably trifluoroacetates). The tri(hydrocarbyl)borons have the formula $BR_3$ in which R is a member of the class of alkyl and aryl hydrocarbon groups containing up to 18 carbon atoms. Triphenylboron is a preferred tri(hydrocarbyl)boron.

The amount of promoter generally is varied from about 1:20 to 50:1 molar ratio of promoter to catalyst. An amount in the molar ratio range of 1:1 to 4:1 is preferred.

In some cases the promoter can be made in situ together with the catalyst. Thus the reduction of a nickel salt with zinc dust in the presence of a suitable phosphorus ligand produces zero-valent nickel compounds suitable for use as catalysts, and, simultaneously, zinc salts which act as promoters.

The process is normally carried out at atmospheric pressure and at any temperature in the range 10°–200° C, preferably in the range 60°–120° C. The pressure is not critical, however, and can be above or below atmospheric pressure if desired. Any of the conventional batch or continuous flow procedures may be used either in the liquid phase or in the vapor phase (with respect to the relatively volatile 2-methyl-3-butenenitrile reactant and linear pentenenitrile products). The reactor may be of any mechanically and chemically resistant material, and is usually of glass or an inert metal or alloy (e.g. nickel, copper, silver, gold, platinum, stainless steel, Monel, Hastelloy).

The process is usually carried out "neat," i.e., without an added diluent or solvent. Any solvent or diluent that is nondestructive of the catalyst can also be used, however. Suitable solvents include aliphatic or aromatic hydrocarbons (hexane, cyclohexane, benzene), ethers (diethyl ether, tetrahydrofuran, dioxane, glycol dimethyl ether, anisole), esters (ethyl acetate, methyl benzoate), or nitriles (acetonitrile, benzonitrile).

A nonoxidizing environment is desirable in order to retard deactivation of the catalyst. Accordingly, an inert atmosphere (e.g., nitrogen) is normally and preferably used although air may be used, if desired, at the expense of loss of a proportion of the catalyst through oxidation.

When the process is a typical batch operation in the liquid phase with or without a solvent, the catalytic nickel complex and the promoter are soluble to some extent at temperatures within the operable range and are usually completely soluble under the most preferred operating conditions.

When a hydrocarbon solvent as cyclohexane is used, the preformed or in situ-prepared promoted catalyst is generally fully dissolved until a temperature of about 50° C. is reached, at which point an insoluble material, usually orange to red in color, is formed which may remain undissolved as the isomerization reaction proceeds. It is believed that the colored material comprises a catalyst complex in which some of the 2-methyl-3-butenenitrile starting material is molecularly combined. The insoluble colored material can be separated from the reaction mixture, isolated as a solid and stored in an inert atmosphere. When such an isolated solid material is placed in contact with 2-methyl-3-butenenitrile it is an active isomerization catalyst under the conditions of the present process.

In a continuous flow procedure in the liquid phase the catalyst, promoter and excess ligand, if used, may all be components of the flowing system. In a semi-vapor phase continuous operation the catalyst, metal salt and/or trihydrocarbyl/boron promoters and excess triaryl phosphite ligand, being essentially nonvolatile, may be in a mobile nonflowing liquid state. If preferred, the catalyst, promoter and nonvolatile excess ligand may be in a fixed bed on a solid support in a conventional flowing vapor phase operation.

The time element in the process is not critical, and may generally be governed by practical considerations. The time required for a practical level of conversion of 2-methyl-3-butenenitrile to linear pentenenitriles is dependent upon the temperature of reaction, i.e., operation at a lower temperature generally requires a longer time than operation at a higher temperature. A practical reaction time can be in the range of a few seconds to many hours, depending on the particular conditions and method of operation. It should be noted, however, that prolonged contact of the linear pentenenitrile product, consisting mainly of 3-pentenenitrile, with the promoted zero-valent nickel catalyst can result in gradual loss of 3-pentenenitrile by secondary rearrangement to 2-methyl-2-butenenitrile especially at higher reaction temperatures.

The molar ratio of 2-methyl-3-butenenitrile to catalyst is generally greater than 1:1, usually in the range from about 10:1 to 2000:1, for a batch operation. However, it is usually in lower proportion, e.g., 1:2, for a continuous operation with a fixed-bed catalyst.

It is stated above that the related copending coassigned patent U.S. Pat. No. 3,496,215 discloses the catalytic zero-valent nickel complex of the present invention as it is used in effecting hydrocyanation of pentenenitriles, including 2-methyl-3-butenenitrile. In the presence of hydrogen cyanide the nickel complex preferentially catalyzes formation of a $C_6$ saturated nitrile (2-methyl-glutaronitrile) from 2-methyl-3-butenenitrile, and though simultaneous rearrangement of 2-methyl-3-butenenitrile may seem possible in the light of the present invention, it is not obvious otherwise that contact of the catalyst with the branched chain pentenenitrile can result in rearrangement of the latter to a linear pentenenitrile. Because of the overriding competitive hydrocyanation reaction, in the practice of the present invention it is necessary to avoid the presence of large amounts of hydrogen cyanide, i.e., any amount of the order of or in excess of a 1:1 mole ratio with the 2-methyl-3-butenenitrile starting material. However, hydrogen cyanide has no significant effect per se on the isomerization reaction and its presence in minor amounts in the starting material can be tolerated if necessary. The isomerization process is preferably conducted in the absence of hydrogen cyanide.

In the isomerization process of converting 2-methyl-3-butenenitrile to linear pentenenitriles, the commercially practical objective is to obtain a maximum of linear pentenenitriles that can be converted to adiponitrile through later hydrocyanation. The related hydrocyanation art is exemplified in U.S. Pat. No. 3,496,217 and U.S. Pat. No. 3,492,218. In these patents, it is shown that the linear 3- and 4- pentenenitriles can be hydrocyanated to adiponitrile in high yield in the presence of zero-valent nickel catalysts. These same catalysts are used in the present isomerization process, which does not involve hydrocyanation. In order to reach an appreciation of the overall picture it is important to understand the dual role of the zero-valent nickel catalysts, i.e., their action as isomerization catalysts on the one hand and their action as hydrocyanation catalysts on the other. In the context of the present invention, the hydrocyanation role is recognized as being inoperative insofar as the preferred conditions of reaction are concerned. However, the hydrocyanation art is relevant because it discloses that the zero-valent nickel catalysts can control several distinct isomerizations among the possible different linear and branched chain pentenenitriles.

From the point of view of manufacturing intermediates to adiponitrile, isomerization of 3-pentenenitrile to 4-pentenenitrile and of 2-methyl-3-butenenitrile to 3-pentenenitrile are desirable and even necessary. On the other hand, isomerizations of 3-pentenenitrile to 2-pentenenitrile or to 2-methyl-2-butenenitrile are undesirable and unnecessary. On the basis of present understanding, the isomerization of 2-methyl-3-butenenitrile to 3-pentenenitrile in the presence of a zero-valent nickel catalyst is reversible, the equilibrium ratio of 3-pentenenitrile to 2-methyl-3-butenenitrile being about 94:6 at operable isomerization temperatures. Secondary isomerizations of 3-pentenenitrile in the presence of zero-valent nickel catalysts may go toward 4-pentenenitrile or toward 2-methyl-2-pentenenitrile. The preferred process of the present invention aids maximum primary isomerization of 2-methyl-3-butenenitrile to 3-pentenenitrile, does not inhibit desirable secondary isomerization of 3-pentenenitrile to 4-pentenenitrile and minimizes undesirable secondary isomeriation of 3-pentenenitrile to 2-methyl-2-pentenenitrile.

To prevent side reaction, it is sometimes advantageous to have an excess of P(XYZ) ligands present with respect to the nickel in the catalyst. The preferred excess ligands are the aryl phosphites wherein the aryl groups contain up to 18 carbon atoms. Generally, the excess ligands are present in at least a 2 molar excess as based on the nickel present. The only limit of excess ligands involves practical considerations. However, generally there is little advantage to be obtained in using over a 300-mole excess of ligand as based on 1 mole of nickel, since the rate of the displacement reaction becomes too slow to be practical due to the decreased concentration of nickel present. The excess ligands may be the same or different from the ligands attached to nickel in the initial nickel catalyst.

EMBODIMENTS OF THE INVENTION

There follow some nonlimiting examples illustrative of the process of the present invention. In these examples, unless otherwise noted, reaction pressures were autogenous. Other pressures are given in terms of mm. of mercury and temperature, in degrees Centigrade. Analyses were made by gas chromatography and the percentages are expressed in terms of area. Gas chromatographic data expressed in area percent are approximations of weight percent: see Purnell, "Gas Chromatography," John Wiley and Sons, 1962, page 275.

EXAMPLE 1

A. A 400-ml. stainless steel reactor was charged with 5.0 g. of tetrakis(triethyl phosphite)nickel(0), i.e., $Ni[P(OC_2H_5)_3]_4$, 10 ml. of benzene and 10 ml. of a pentenenitrile fraction containing 84.7 percent 2-methyl-3-butenenitrile, 11 percent 3-pentenenitrile and 4.2 percent 2-methyl-2-butenenitrile. The reaction mixture was heated at 100° C. for 8 hours under autogenous pressure. The resultant liquid product (19.3 g.) was distilled under a pressure of 0.1 mm., the pot temperature being advanced gradually to 100° C. Distillate, 14.63 g., residue 3.22 g. Gas chromatographic analysis of the distillate showed it to contain 34 percent 2-methyl-3-butenenitrile, 13 percent 3-pentenenitrile, 52 percent 2-methyl-2-butenenitrile and 0.4 percent 4-pentenenitrile.

B. A mixture of 5.0 g. of $Ni[P(OC_2H_5)_3]_4$ and 20 g. of a pentenenitrile fraction containing 98.9 percent 2-methyl-3-butenenitrile, 0.5 percent 2-methyl-2-butenenitrile and less than 0.1 percent 3-pentenenitrile, charged under nitrogen, was heated at 100° C. for 2.5 hours. The crude product, analyzed by gas chromatography, contained 69.7 percent 2-methyl-3-butenenitrile, 26.9 percent 2-methyl-2-butenenitrile and 2.5 percent 3-pentenenitrile.

Example 1 is a control demonstrating the catalytic action of an unpromoted zero-valent nickel complex on the rearrangement of 2-methyl-3-butenenitrile.

EXAMPLES 2–65

The reactions described in these examples were conducted at atmospheric pressure in a 10 ml. 3-necked flask equipped with a condenser, thermocouple and rubber serum cap for withdrawing samples. The reactants were kept under an inert atmosphere throughout all stages. The reactor was charged with the nickel catalyst, promoter, if used, and the pentenenitrile starting material; the reaction mixture was stirred at room temperature; and in some instances an analytical sample was then withdrawn. The remaining reaction mixture was heated gradually to the reaction temperature and held there for the indicated time. The reaction mixture was then cooled to room temperature, and a sample was withdrawn for analysis by gas chromatography.

Table I represents the data for examples 2–65, which demonstrate the effect of various metal salts and of trihydrocarbyl boron as promoters for the zero-valent nickel catalyst rearrangement of 2-methyl-3-butenenitrile (2M–3 BN) to 3- and 4-pentenenitrile (3–PN and 4–PN), i.e., the desired reaction of the invention. Catalyst A is shown by Vinal, et al., Inor. Chem. 3, 1062 (1964) and Catalysts B, C and D by U.S. Pat. Nos. 3,152,158 and 3,328,443.

TABLE I

| Example | Catalyst [a] (g.) | Promoter (g.) | Mole ratio (pro./cat.) | 2M-3BN [b] Percent | 2M-3BN [b] Ml. | Temp., °C. | Time, hrs. | Product, percent 2M-3BN | Product, percent Combined 3- and 4-PN |
|---|---|---|---|---|---|---|---|---|---|
| 2 | | $ZnCl_2$ (0.032) | | 96.3 | 2.0 | 80 | 3 | 95.1 | |
| 3 | | $ZnCl_2$ (0.029) | | 99.4 | 2.0 | 120 | 2 | 98.7 | |
| 4 | A (0.508) | | | 99.0 | 2.0 | 100 | 1 | 96.6 | 0.4 |
| 5 | C (0.323) | | | 97.6 | 2.0 | 120 | 2 | 76.9 | 20.6 |
| 6 | A (0.514) | $ZnCl_2$ (0.134) | 1.4/1 | 99.1 | 2.0 | 25 | 2.5 | 93.1 | 0.5 |
| 7 | A (0.160) | $ZnCl_2$ (0.030) | 1/1 | 96.4 | 2.0 | 80 | 3 | 76.0 | 5.5 |
| 8 | A (0.157) | $ZnCl_2$ (0.030) | 1/1 | 99.1 | 2.0 | 120 | 2 | 3.6 | 51.1 |
| 9 | B (0.288) | $ZnCl_2$ (0.030) | 1/1 | 96.4 | 2.0 | 80 | 3 | 31.2 | 64.3 |
| 10 | B (0.397) | $ZnCl_2$ (0.040) | 1/1 | 99.1 | 2.75 | 120 | 2 | 6.0 | 89.1 |
| 11 | D (0.733) | $ZnCl_2$ (0.061) | 1/1 | 95.2 | 4.0 | 80 | 3 | 11.4 | 83.6 |
| 12 | D (0.377) | $ZnCl_2$ (0.032) | 1/1 | 96.2 | 2.0 | 80 | 3 | 9.3 | 87.6 |
| 13 | D (1.097) | $ZnCl_2$ (0.096) | 1/1 | 97.8 | 6.0 | 120 | 2 | 6.1 | 87.8 |
| 14 | C (0.323) | $ZnCl_2$ (0.030) | 1/1 | 99.3 | 4.0 | 80 | 3 | 78.8 | 20.1 |
| 15 | C (0.324) | $ZnCl_2$ (0.031) | 1/1 | 99.3 | 2.0 | 80 | 3 | 10.9 | 87.7 |

TABLE I—Continued

| Example | Catalyst (g.) | Promoter (g.) | Mole ratio (pro./cat.) | 2M-3BN [b] Percent | Ml. | Temp., °C. | Time, hrs. | Product, percent 2M-3BN | Combined 3- and 4-PN |
|---|---|---|---|---|---|---|---|---|---|
| 16 | C (0.323) | ZnCl₂ (0.030) | 1/1 | 96.3 | 2.0 | 80 | 3 | 17.3 | 78.7 |
| 17 | C (0.324) | ZnCl₂ (0.121) | 4/1 | 96.3 | 2.0 | 80 | 3 | 20.8 | 75.3 |
| 18 | C (0.327) | ZnCl₂ (0.061) | 2/1 | 96.3 | 2.0 | 80 | 3 | 25.8 | 70.6 |
| 19 | C (0.645) | ZnCl₂ (0.059) | 1/1 | 99.3 | 2.0 | 80 | 3 | 7.4 | 91.5 |
| 20 | C (0.645) | ZnCl₂ (0.060) | 1/1 | 97.6 | 4.0 | 120 | 2 | 6.5 | 87.6 |
| 21 | C (0.322) | ZnCl₂ (0.060) | 2/1 | 98.7 | 2.0 | 120 | 2 | 5.1 | 88.7 |
| 22 | C (0.322) | ZnCl₂ (0.119) | 4/1 | 98.7 | 2.0 | 120 | 2 | 5.7 | 90.8 |
| 23 | C (0.323) | ZnCl₂ (0.032) | 1/1 | 52.6 | 2.0 | 80 | 3 | 17.2 | 81.8 |
| 24 | C (0.321) | ZnCl₂ (0.030) | 1/1 | 45.3 | 2.0 | 120 | 2 | 5.8 | 91.2 |
| 25 | C (0.331) | ZnCl₂ (0.030) | 1/1 | 26.4 | 2.0 | 80 | 3 | 8.8 | 88.7 |
| 26 | C (0.322) | ZnCl₂ (0.030) | 1/1 | 5.3 | 2.0 | 120 | 2 | 4.6 | 92.4 |
| 27 | C (0.323) | ZnBr₂ (0.052) | 1.1/1 | 96.3 | 2.0 | 80 | 3 | 19.0 | 77.5 |
| 28 | C (0.323) | ZnBr₂ (0.049) | 1.1/1 | 99.4 | 2.0 | 120 | 2 | 7.8 | 87.4 |
| 29 | C (0.322) | ZnSO₄ (0.034) | 1/1.05 | 99.3 | 2.0 | 80 | 3 | 92.1 | 6.1 |
| 30 | C (0.333) | ZnSO₄ (0.035) | 1/1.05 | 99.4 | 2.0 | 120 | 2 | 13.0 | 84.6 |
| 31 | C (0.323) | Zn₃(PO₄)₂ (0.086) | 1/1 | 99.3 | 2.0 | 80 | 3 | 84.5 | 14.0 |
| 32 | C (0.356) | Zn₃(PO₄)₂ (0.086) | 1/1 | 99.4 | 2.0 | 120 | 2 | 11.8 | 85.4 |
| 33 | C (0.325) | Zn(O₂CCF₃)₂ (0.064) | 1/1 | 96.3 | 2.0 | 80 | 3 | 69.1 | 25.2 |
| 34 | C (0.327) | Zn(O₂CCF₃)₂ (0.063) | 1/1 | 99.4 | 2.0 | 120 | 2 | 8.3 | 88.6 |
| 35 | C (0.322) | CuCl (0.022) | 1/1 | 99.3 | 2.0 | 80 | 3 | 88.7 | 10.4 |
| 36 | C (0.328) | CuCl (0.022) | 1/1 | 99.4 | 2.0 | 120 | 2 | 53.7 | 45.0 |
| 37 | C (0.322) | CdCl₂ (0.041) | 1/1 | 99.3 | 2.0 | 80 | 3 | 88.6 | 10.3 |
| 38 | C (0.320) | CdCl₂ (0.040) | 1/1 | 98.5 | 2.0 | 120 | 2 | 14.0 | 84.7 |
| 39 | C (0.327) | AlCl₃ (0.028) | 1/1 | 96.4 | 2.0 | 80 | 3 | 85.6 | 10.4 |
| 40 | C (0.326) | AlCl₃ (0.032) | 1/1 | 99.2 | 2.0 | 120 | 2 | 59.2 | 36.2 |
| 41 | C (0.321) | CeCl₃ (0.054) | 1/1 | 99.3 | 2.0 | 80 | 3 | 88.7 | 9.6 |
| 42 | C (0.327) | CeCl₃ (0.056) | 1/1 | 99.4 | 2.0 | 120 | 2 | 14.3 | 83.9 |
| 43 | C (0.321) | SnCl₂ (0.043) | 1/1 | 99.5 | 2.0 | 80 | 3 | 80.3 | 17.4 |
| 44 | C (0.327) | TiCl₃ (0.035) | 1/1 | 99.6 | 2.0 | 80 | 3 | 33.9 | 65.2 |
| 45 | C (0.322) | HfCl₄ (0.072) | 1/1 | 99.3 | 2.0 | 80 | 3 | 53.9 | 2.1 |
| 46 | C (0.324) | HfCl₄ (0.070) | 1/1 | 98.5 | 2.0 | 120 | 2 | 52.6 | 6.0 |
| 47 | C (0.323) | VCl₃ (0.035) | 1/1 | 99.8 | 2.0 | 80 | 3 | 94.1 | 5.3 |
| 48 | C (0.324) | VCl₃ (0.034) | 1/1 | 99.1 | 2.0 | 120 | 2 | 23.1 | 72.6 |
| 49 | C (0.325) | CrCl₃ (0.037) | 1/1 | 99.8 | 2.0 | 80 | 3 | 52.7 | 46.7 |
| 50 | C (0.326) | CrCl₃ (0.035) | 1/1 | 99.1 | 2.0 | 120 | 2 | 38.5 | 58.2 |
| 51 | C (0.324) | MoCl₂ (0.038) | 1/1 | 99.3 | 2.0 | 80 | 3 | 86.5 | 12.6 |
| 52 | C (0.324) | MoCl₂ (0.039) | 1/1 | 99.4 | 2.0 | 120 | 2 | 9.0 | 87.7 |
| 53 | C (0.323) | MnCl₂ (0.029) | 1/1 | 96.4 | 2.0 | 80 | 3 | 82.9 | 13.6 |
| 54 | C (0.332) | MnCl₂ (0.026) | 1/1 | 99.2 | 2.0 | 120 | 2 | 23.0 | 73.6 |
| 55 | C (0.323) | FeCl₂ (0.029) | 1/1 | 96.4 | 2.0 | 80 | 3 | 49.5 | 46.1 |
| 56 | C (0.323) | FeCl₂ (0.028) | 1/1 | 99.2 | 2.0 | 120 | 2 | 7.6 | 88.2 |
| 57 | C (0.324) | FeCl₃ (0.037) | 1/1 | 96.4 | 2.0 | 80 | 3 | 80.7 | 11.5 |
| 58 | C (0.328) | FeCl₃ (0.035) | 1/1 | 99.1 | 2.0 | 120 | 2 | 7.0 | 81.8 |
| 59 | C (0.321) | CoCl₂ (0.028) | 1/1 | 99.7 | 2.0 | 80 | 3 | 8.3 | 91.2 |
| 60 | C (0.322) | CoCl₂ (0.029) | 1/1 | 98.4 | 2.0 | 120 | 2 | 5.5 | 92.8 |
| 61 | C (0.322) | NiCl₂ (0.029) | 1/1 | 96.3 | 2.0 | 80 | 3 | 87.4 | 7.9 |
| 62 | C (0.327) | NiCl₂ (0.029) | 1/1 | 98.4 | 2.0 | 120 | 2 | 72.9 | 24.9 |
| 63 | C (0.323) | B(C₆H₅)₃ (0.054) | 1/1 | 96.4 | 2.0 | 80 | 3 | 84.5 | 9.3 |
| 64 | C (0.322) | B(C₆H₅)₃ (0.051) | 1/1 | 99.2 | 2.0 | 120 | 2 | 12.3 | 72.7 |
| 65 | C (0.324) | B(n-C₄H₉)₃ (0.040) | 1/1 | 98.8 | 2.0 | 80 | 3 | 94.0 | 4.2 |

[a] Catalyst A was preformed tetrakis(triethyl phosphite)nickel(O), Ni[P(OC₂H₅)₃]₄; B, tetrakis(triphenyl phosphite)nickel(O), Ni[P(OC₆H₅)₃]₄; C, tetrakis(p-tolyl phosphite)nickel(O), Ni[P(OC₆H₄CH₃)₃]₄; and D, tetrakis(p-methoxyphenyl phosphite), Ni[P(OC₆H₄OCH₃)₃]₄.

[b] Purity of the starting material in percent 2M-3BN is shown; balance of starting material includes no 3- or 4-PN unless otherwise indicated.

[c] Starting materials contained 3- and 4-PN as follows: Ex. 23, 46.9% 3-PN; Ex. 24, 53.5% 3-PN; Ex. 25, 71.4% 3- and 4-PN; Ex. 26, 93.7% 3-PN.

EXAMPLES 66 and 67

The apparatus and procedure of Examples 2 to 65 were used and analytical samples were withdrawn over an extended period of time. The results demonstrate that time is not a critical factor in the process. It may be noted that the conversion of 2-methyl-3-butenenitrile (2M-3BN) to linear pentenenitriles proceeded to a stabilized point at which the concentration of 2M-3BN was about 5 to 6 percent, and that at 120° C. there was a gradual loss of 3- and 4-pentenenitriles accompanied by a corresponding gain in the concentration of 2-methyl-2-butenenitrile (2M-2BN). The following Table presents data for reaction mixtures containing 4.0 ml. of 2M-3BN, 0.060–0.062 gram of ZnCl₂, and 0.644–0.655 grams of catalyst C of Table I, i.e., Ni[P(OC₆H₄CH₃)₃]₄.

TABLE II

| Example | Temp. °C | Time Hrs | Product %2M-3BN | %3- and 4-PN | %2M-2BN |
|---|---|---|---|---|---|
| 66 | 80 | 0 | 99.4 | 0.0 | 0.5 |
| 66 | 80 | 2 | 67.0 | 32.2 | 0.7 |
| 66 | 80 | 5 | 30.4 | 68.6 | 0.8 |
| 66 | 80 | 24 | 5.1 | 94.0 | 0.7 |
| 67 | 120 | 0 | 99.2 | 0.0 | 0.5 |
| 67 | 120 | 2 | 6.0 | 90.5 | 2.9 |
| 67 | 120 | 5 | 5.2 | 89.6 | 4.3 |
| 67 | 120 | 29 | 5.8 | 76.3 | 14.5 |

EXAMPLES 68–85

These examples demonstrate the zinc chloride-promoted rearrangement of 2-methyl-3-butenenitrile to linear pentenenitriles in the necessary presence of a zero-valent nickel catalyst containing a triaryl phosphite ligand and prepared in situ. The procedure of Examples 2–67 was used and the apparatus was the same except in Examples 69–72 which employed scaled-up equipment.

The preparation of zero-valent nickel compounds used as starting materials in preparing the catalysts is shown by: Dub, Organometallic Chemistry, Vol. I, pp. 639–651, Springer-Verlag, Inc., New York (1966) — Examples 75–80 and 85; Zeiss, Organometallic Chemistry, p. 484, Reinhold Publishing Corp., New York (1960) — Examples 81, 82 and 84; and Malatesta and Sacco, Ann. Chem. Rome 44, 134 (1954) — Example 83. The mole ratio of promoter to zero-valent nickel catalyst (where used) was 1:1 except in Examples 70, 76 and 79 (1:1.1), 75 (1:1.4), 77 and 78 (1:2) and 83 (1:2.4).

In Examples 69–74, the zinc chloride is generated in situ, by reaction of zinc dust with nickel chloride as the zero-valent nickel catalyst is formed.

The data for Examples 68–85 are presented in Table III.

TABLE III

| | Reactants | | | 2M-3BN[b] | | | | Product, percent | |
|---|---|---|---|---|---|---|---|---|---|
| Ex. | Nickel compound [g.] | Ligand[a] radical (g.) | Promoter (g.) | Percent | Amount, ml. | Temp., °C. | Time, hrs. | 2M-3BN | Combined 3- and 4-PN |
| 68 | | C₆H₅ (0.278) | ZnCl₂ (0.030) | 99.3 | 2.0 | 120 | 2 | 99.4 | 0.0 |
| 69 | NiCl₂ [0.260] | p-C₆H₄OCH₃ (3.24) | Zn dust (0.13) | 98.8 | ᶜ15.68 | 110 | 2 | 41.77 | 31.7 |
| 70 | NiCl₂ [1.29] | p-C₆H₄CH₃ (3.49) | Zn dust (0.6) | | ᶜ22.09 | 109 | {0.25, 3} | {70.81, 2.77} | {1.82, 60.43} |
| 71 | NiCl₂ [1.33] | p-C₆H₄CH₃ (6.92) | Zn dust (0.67) | | ᶜ22.59 | | {0.25, 3} | {63.78, 2.48} | {0.18, 53.86} |
| 72 | NiCl₂ [1.03] | p-C₆H₄CH₃ (11.72) | Zn dust (0.521) | | ᶜ11.72 | 117 | 3.2 | 1.78 | 39.59 |
| 73 | NiCl₂ [0.030] | C₆H₅ (0.313) | Zn dust (0.014) | 96.3 | 2.0 | 80 | 3 | 93.9 | 2.3 |
| 74 | NiCl₂ [0.030] | C₆H₅ (0.309) | Zn dust (0.015) | 98.6 | 2.0 | 120 | 2 | 6.0 | 91.2 |
| 75 | Ni(C₅H₅)₂ [0.043] | C₆H₅ (0.284) | ZnCl₂ (0.029) | 99.8 | 2.0 | 80 | 3 | 72.4 | 26.1 |
| 76 | Ni(C₅H₅)₂ [0.040] | C₆H₅ (0.276) | ZnCl₂ (0.032) | 99.6 | 2.0 | 120 | 2 | 10.7 | 86.6 |
| 77 | (see structure below) [0.094] | C₆H₅ (0.274) | ZnCl₂ (0.031) | 99.5 | 2.0 | 80 | 3 | 97.0 | 2.0 |
| 78 | (C₅H₅Ni)₂(CO)₂ [0.069] | C₆H₅ (0.278) | ZnCl₂ (0.032) | 96.4 | 2.0 | 80 | 3 | 95.0 | 0.2 |
| 79 | (C₆H₅)₃P—Ni—C₃H₅, Cl [0.090] | C₆H₅ (0.269) | ZnCl₂ (0.032) | 99.5 | 2.0 | 80 | 3 | 77.6 | 20.5 |
| 80 | (C₆H₅)₃P—Ni—C₅H₅, Br [0.102] | C₆H₅ (0.276) | ZnCl₂ (0.032) | 99.8 | 2.0 | 80 | 3 | 99.0 | 0.2 |
| 81 | [(C₆H₅)₃P]₂Ni(CO)₂ [0.140] | C₆H₅ (0.275) | ZnCl₂ (0.030) | 99.2 | 2.0 | 120 | 2 | 92.9 | 3.9 |
| 82 | [C₆H₅O\P=(C₆H₅)₂]₂Ni(CO)₂ [0.152] | C₆H₅ (0.282) | ZnCl₂ (0.030) | 99.1 | 2.0 | 120 | 2 | 96.8 | 1.2 |
| 83 | [C₆H₅O)₃P]₃Ni(CO) [0.227] | C₆H₅ (0.278) | ZnCl₂ (0.032) | 99.7 | 2.0 | 80 | 3 | 99.1 | 0.4 |
| 84 | [(C₆H₅)₃As]₂Ni(CO)₂ [0.161] | C₆H₅ (0.276) | ZnCl₂ (0.031) | 99.1 | 2.0 | 120 | 2 | 96.1 | 2.4 |
| 85 | C₅H₅Ni)₂(SC₆H₅)₂ [0.104] | C₆H₅ (0.271) | ZnCl₂ (0.030) | 99.7 | 2.0 | 80 | 3 | 98.7 | 0.6 |

[a] The ligand has the formula P(OR)₃ in which R is the ligand radical.
[b] Purity of the starting material in percent 2M-3BN is shown; balance of starting material includes no 3- or 4-PN.
ᶜ Grams.

Structure for Example 77:

$$\text{C}_5\text{H}_5\text{Ni} \underset{\underset{\text{C}_6\text{H}_5}{\text{C}}}{\overset{\text{C}_6\text{H}_5}{\diagdown\diagup}} \text{NiC}_5\text{H}_5$$

EXAMPLE 86

The reaction was carried out at atmospheric pressure in a 25 ml 2-necked flask equipped with a condenser and thermocouple, keeping the reactants under an inert atmosphere throughout all stages. The reactor was charged with 0.230 g. of zinc chloride, 1.366 g. of tetrakis(p-methoxyphenyl phosphite)nickel(0), 15 ml. of cyclohexane and 0.3 ml. of 99.8 percent 2-methyl-3-butenenitrile. The molar proportions in this mixture are 1:2:4 of Ni(O) compound:ZnCl₂:nitrile. The reaction mixture was heated to 74° C., with stirring, and a red precipitate began forming at about 50° C. After 10 minutes at 74° C. the reaction mixture was filtered, using a hot funnel. The orange-red solid was collected in the funnel, removed and washed with small portions of hot cyclohexane. The washing and filtering operation was repeated five times, after which the solid was dried in vacuum for 40 hours, transferred into a vial and stored in a refrigerator kept inside an enclosure having maintained atmosphere of dry nitrogen.

A 2-ml. flask equipped with a condenser and a thermocouple was charged with 0.081 g. of the washed and dried orange-red solid and 0.5 ml. of 99.8 percent 2-methyl-3-butenenitrile, all under a nitrogen atmosphere in a dry-box. The reaction mixture was stirred at room temperature, an orange-red solution was formed within a few minutes, and a sample of the solution promptly withdrawn for gas chromatographic analysis showed the presence of 2.8 percent t-3-pentenenitrile. The solution was then gradually heated, with stirring, to 80° C. and kept there for 3 hours. The solution was then cooled rapidly to room temperature and analyzed by gas chromatography with results showing the presence of 20.2 percent unchanged 2-methyl-3-butenenitrile and 78.9 percent of 3- and 4-pentenenitriles.

EXAMPLE 87

In the manner of Example 86, two separate mixtures of 0–172 g. of zinc chloride, 1.208 g. of tetrakis(p-tolyl phosphite)nickel(0), 15 ml. of cyclohexane and 0.3 ml. of 99.7 percent 2-methyl-3-butenenitrile [mole ratio Ni:Zn:nitrile = 1:1.5:4] were stirred and heated to 80° C. for 15 minutes. The reaction mixtures were combined and then decanted, leaving a red precipitate which was washed 10 times with hot cyclohexane and dried under vacuum. A sample of the dried solid (0.081 g.) was dissolved in 0.5 ml. of 99.7 percent 2-methyl-3-butenenitrile, and the solution was heated at 80° C. for 2.7 hours. The cooled solution was analyzed by gas chromatography, which showed the presence of 67.3 percent of unchanged 2-methyl-3-butenenitrile and 31.0 percent of 3- and 4-pentenenitriles.

EXAMPLE 88

In the manner of Example 87, a dried red solid catalyst was prepared from 0.34 g. of zinc chloride, 2.134 g. of tetrakis(phenyl phosphite)nickel(0) and 0.6 ml. of 99.6 percent of 2-methyl-3-butenenitrile [mole ratio Ni:Zn:nitrile = 1:1.5:4[, reacted in 40 ml. of cyclohexane at 80°–90° C. for about 4 hours. A sample of the solid catalyst (0.086 g.) was dissolved in 0.5 ml. of 99.6 percent of 2-methyl-3-butenenitrile, and the solution was heated at 80° C. for 3 hours. The resulting solution showed the presence of 43 percent unchanged 2-methyl-3-butenenitrile and 56 percent 3- and 4-pentenenitrile, by gas chromatographic analysis.

EXAMPLE 89

In the manner of Examples 2–65, a pair of runs were made with 2 ml. of 99.9 percent 2-methyl-3-butenenitrile and 0.187 g. of [(EtO)₂C₆H₅P]₄Ni at 80° C. for 3 hours, one of the reaction mixtures also containing 0.030 g. of zinc chloride. Gas chromatographic analyses of the products showed that the mixture with zinc chloride contained 84.9 percent unchanged 2-methyl-3-butenenitrile and 7.3 percent 3- and 4-pentenenitrile, whereas the mixture without zinc chloride contained 98.4 percent and 1.2 percent of these components, respectively.

EXAMPLE 90

A. The reaction was carried out at atmospheric pressure in a 25-ml. two-necked flask equipped with a condenser and thermocouple, keeping the reactants under an inert atmosphere throughout all stages. The reactor was charged with 0.162 g. of zinc dust, 0.327 g. of nickel chloride (NiCl$_2$), 2.017 g. of tris(p-methoxyphenyl) phosphite, 0.807 g. of 2-methyl-3-butenenitrile and 10 ml. of toluene. The molar proportions of Zn:NiCl$_2$:phosphite:nitrile in this mixture are 1:1:2:4. The mixture was stirred, gradually heated to 80° C., and kept at this temperature for about 1 hour and 10 minutes. The reaction mixture was then filtered while hot, giving an orange-red filtrate which was concentrated under vacuum at room temperature. The concentrated solution was placed in a refrigerator located inside an enclosure (dry-box) having a maintained atmosphere of dry nitrogen. The chilled mixture was again filtered, and the filtrate this time was evaporated to dryness under vacuum. The residual orange-red solid product was placed in a vial and stored in the refrigerator inside the dry-box.

B. Following the procedure of Example 86, 0.078 g. of the orange-red solid and 0.51 ml. of 97.2 percent 2-methyl-3-butenenitrile were mixed and heated to 80° C. for 3.08 hours. Gas chromatographic analysis of the reaction mixture showed the presence of 55.0 percent of unchanGed 2-methyl-3-butenenitrile and 42.2 percent of 3- and 4-pentenenitriles.

EXAMPLES 91–95

These examples, and also Examples 86–88 and 90, demonstrate the separation and isolation of solid zinc chloride-promoted nickel-containing material from typical isomerization reaction mixtures containing at least one pentenenitrile. These solid materials are shown to be active catalysts for the isomerization of 2-methyl-3-butenenitrile to 3- and 4-pentenenitriles. The procedure of Example 90 was used for Examples 91–95, and the data are presented in Table IV.

EXAMPLE 96

A reaction flask was charged with 0.8 g. of Ni[(C$_6$H$_5$)$_3$Sb]$_2$(CO)$_2$, 0.14 ZnCl$_2$, 1.4G. of P(OC$_6$H$_4$CH$_3$)$_3$, and 25 ml. of 2-methyl-3-butenenitrile. The mixture is maintained at 120° C. for 17 hours. Gas chromatographic analysis shows that the crude product contains 43.96 percent trans-3-pentenenitrile, 1.37 percent cis-3-pentenenitrile, 0.09 percent trans-2-pentenenitrile and 1.50 percent 4-pentenenitrile, corrected for dilution. The starting material contained 2.88 percent 3-pentenenitrile.

EXAMPLES 97–101

A series of catalytic isomerization reactions were run in small glass vessels thermostatted at 100° C. In each instance 40 ml. of crude 2-methyl-3-butenenitrile were added and 40 ml. of a tetrakis tritolyl phosphite nickel catalyst solution with excess tritolyl phosphite were added, the mole ratio of nickel to tritolyl phosphite being 4.3/1. Varying amounts of zinc chloride were used. Analyses of the liquids in weight percent of components as determined by gas chromatography at the start and at the end of the reactions are shown in Table V together with the weights (g.) of ZnCl$_2$ used, the approximate concentration of nickel in moles/liter in the solutions and the times required in minutes to achieve 85 percent conversion of 2-methyl-3-butenenitrile to 3 and 4 pentene nitriles.

TABLE V

| Example | ZnCl$_2$, gm. | Analysis at start, wt. percent | | Analysis at end, wt. percent | | Moles Ni per liter (approx.) | Time for 85% conversion (minutes) |
|---|---|---|---|---|---|---|---|
| | | 2M3BN | 3- and 4-PN | 2M3BN | 3- and 4-PN | | |
| 97 | 1 | 26.55 | 4.34 | 4.49 | 27.83 | 0.055 | 77 |
| 98 | 2 | 28.25 | 5.05 | 4.12 | 28.16 | 0.129 | 40 |
| 99 | 0.5 | 29.28 | 4.68 | 1.70 | 31.89 | 0.035 | 105 |
| 100 | 0.25 | 29.46 | 4.07 | 1.69 | 31.47 | 0.020 | 155 |
| 101 | 0.10 | 28.7 | 5.33 | 4.12 | 29.10 | 0.0093 | 315 |

The linear pentenenitriles (3-pentenenitrile and 4-pentenenitrile) obtained by means of the present invention are useful as intermediates to adiponitrile, which is a well-known intermediate used in the production of commercial polyamides useful in the form of fibers, films and molded articles.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process of isomerizing 2-methyl-3-butenenitrile and thereby producing a linear pentenenitrile which comprises
   contacting said 2-methyl-3-butenenitrile, at a temperature in the range of 10° to 200° C. with a promoted catalyst consisting essentially of:
   a. at least one zero-valent nickel complex catalyst having at least one ligand consisting of tris(p-methoxyphenyl) phosphite or a ligand of the formula P(XYZ) wherein X is OR and Y and Z are OR or R, R being an alkyl or aryl group of up to 18 carbon atoms, and wherein any two of X, Y and Z can be conjoined to form a divalent radical, and
   b. at least one promoter consisting of compounds of the formula BR'$_3$ wherein each R' is an alkyl or aryl hydrocarbon group of up to 18 carbon atoms, or salts of metals of atomic number 13, 21–32, 39–50 and 57–82, the mole ratio of promoter to catalyst being in the range of 1:20 to 50:1.

TABLE IV

| Example | 91 [c] | 92 [c] | 93 [c] | 94 | 95 |
|---|---|---|---|---|---|
| Part A: | | | | | |
| Zn, g | 0.329 | 0.320 | 0.327 | 0.572 | 0.568. |
| NiCl$_2$, g | 0.650 | 0.668 | 0.652 | 1.131 | 1.140. |
| Ligand R [a] (g.) | Mixed o, m and p-tolyl (3.539). | n-C$_4$H$_9$ (2.485) | p-C$_6$H$_4$-C$_9$H$_{19}$ (6.900) | Mixed o, m and p-tolyl (7.698). | o-Tolyl (7.701). |
| R'CN [b] | 2M-3BN (6.423 g.) | 2M-3BN (1.578 g.) | 2M-3BN (1.593 g.) | 3-PN (14.014 g.) | 3-PN (11.87 ml.). |
| Solvent (ml.) | Cyclohexane (24) | Cyclohexane (40) | Cyclohexane (40) | | |
| Mol ratio, Zn:Ni:P(OR)$_3$:R'CN | 1:1:2:16 | 1:1:2:4 | 1:1:2:4 | 1:1:2.5:20 | 1:1:2.5:20. |
| Temp., ° C | 80 | 80 | 80 | 110 | 110. |
| Time, hours | 2.24 (average) | 5.59 (average) | 16.15 (average) | 2.3 | 2.0. |
| Part B: | | | | | |
| Solid, g | 0.080 | 0.079 | 0.409 | 0.101 | .098. |
| 2M-3BN, percent (ml.) | 99.7 (0.50) | 99.7 (0.50) | 99.6 (0.30) | 99.7 (0.50) | 99.5 (0.50). |
| Temperature, ° C | 80 | 80 | 100 | 80 | 80. |
| Time, hours | 3 | 3 | 3.05 | 3 | 3. |
| Product, percent: | | | | | |
| 2M-3BN | 58.7 | 91.5 | 97.9 | 65.8 | 89.6. |
| 3- and 4-PN | 40.5 | 2.0 | 0.8 | 32.9 | 9.4. |

[a] Ligand formula is P(OR)$_3$, R being the ligand radical.
[b] R'CN is pentenenitrile: 2M-3BN being 2-methyl-3-butenenitrile, and 3- and 4-PN being 3- and 4-pentenenitrile, respectively.
[c] Runs in section A in which solids were isolated from twin initial runs and then combined prior to storage and testing.

2. The process of claim 1 wherein R is an aryl group.

3. The process of claim 1 wherein P(XYZ) is an aryl phosphite.

4. The process of claim 3 wherein the promoter is zinc chloride.

5. The process of claim 3 wherein the promoter is cadmium chloride.

6. The process of claim 3 wherein the promoter is nickel chloride.

7. The process of claim 3 wherein the promoter is copper chloride.

8. The process of claim 3 wherein the promoter is iron chloride.

9. The process of claim 3 wherein the promoter is cobalt chloride.

10. The process of claim 3 wherein the promoter is aluminum chloride.

11. The process of claim 3 wherein the promoter is triphenyl boron.

12. The process of claim 1 wherein the catalyst is prepared in situ.

13. The process of claim 1 wherein the catalyst is of a ligand consisting of tris(p-methoxyphenyl) phosphite or a ligand of the formula P(XYZ) wherein X is OR and Y and Z are R or OR wherein R is alkyl or aryl of up to 18 carbons and any of X, Y and Z can be conjoined to form a divalent radical, with an intermediate nickel compound of the formula

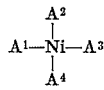

in which $A^1$, $A^2$, $A^3$ and $A^4$ are the same or different neutral ligands selected from
  a. carbon monoxide;
  b. M(X'Y'Z') wherein M is P, Sb or As and X', Y' and Z' are the same or different and are R', NR'$_2$, Cl and F, R' being alkyl or aryl of up to 18 carbon atoms; and
  c. acrylonitrile, two molecules of acrylonitrile satisfying either all of the A's or only two of the A's, in the latter case the other two A's being satisfiled by M(X'Y'Z').

14. The process of claim 1 wherein the catalyst is formed by reduction of a nickel salt in the presence of a ligand consisting of tris(p-methoxyphenyl) phosphite or a ligand of the formula P(XYZ) in which X is OR and Y and Z are R or OR; R being an alkyl or aryl group of from 1 to 18 carbon atoms and any two of X, Y and Z can be conjoined to form a divalent radical.

15. Process of claim 14 in which said nickel salt is a nickel halide which is reduced with zinc dust.

16. Process of claim 15 wherein R is an aryl group.

17. Process of claim 15 wherein P(XYZ) is a triaryl phosphite.

18. Process of claim 15 wherein the phosphorus ligand is tris(p-methoxyphenyl) phosphite.

19. In the process of isomerizing 2-methyl-3-butenenitrile to pentenenitrile with a zero-valent nickel catalyst having at least one ligand consisting of tris(p-methoxyphenyl) phosphite or a ligand of the formula P(XYZ) wherein X is OR and Y and Z are R or OR, R being an alkyl group or an aryl group of one to 18 carbon atoms and any two of X, Y and Z can be conjoined to form a divalent radical the improvement which comprises conducting said process in the presence of a promoter consisting essentially of BR'$_3$ when R' is alkyl or aryl of one to 18 carbon atoms or salts of metals having atomic numbers 13, 21-32, 39-50, and 57-82 in a mole ratio of promoter to catalyst of from 1:20 to 50:1.

20. The process of claim 19 in which said promoter is zinc chloride.

21. The process of claim 19 in which said promoter is cadmium chloride.

22. The process of claim 19 in which said promoter is nickel chloride.

23. The process of claim 19 in which said promoter is copper chloride.

24. The process of claim 19 in which said promoter is iron chloride.

25. The process of claim 19 in which said promoter is cobalt chloride.

26. The process of claim 19 in which said promoter is aluminum chloride.

27. The process of claim 19 in which said promoter is triphenyl boron.

* * * * *